United States Patent [19]

Guch, Jr. et al.

[11] Patent Number: 4,494,235

[45] Date of Patent: Jan. 15, 1985

[54] MULTIPLE WAVELENGTH LASER

[75] Inventors: Steve Guch, Jr., Saratoga; Phillip J. Gardner, Cupertino, both of Calif.; Leonard W. Braverman, Moorestown, N.J.; Robert W. Jones, San Jose, Calif.

[73] Assignee: GTE Government Systems Corporation, Stamford, Conn.

[21] Appl. No.: 606,543

[22] Filed: May 3, 1984

Related U.S. Application Data

[63] Continuation-in-part of Ser. No. 536,566, Sep. 27, 1983, which is a continuation-in-part of Ser. No. 257,056, Apr. 24, 1981.

[51] Int. Cl.$^3$ .............................................. H01S 3/098
[52] U.S. Cl. ........................................ 372/23; 372/20; 372/101; 372/95; 372/19; 350/162.12
[58] Field of Search ................... 372/103, 70, 23, 98, 372/102, 101, 107, 85, 20, 19; 350/162.12, 162.15

[56] References Cited

U.S. PATENT DOCUMENTS

| | | | |
|---|---|---|---|
| 3,623,024 | 11/1971 | Hamilton | 350/162.12 |
| 3,729,634 | 4/1973 | Jensen et al. | 350/162.12 |
| 3,961,841 | 6/1976 | Giordmaine | 350/168 |
| 3,977,771 | 8/1976 | Horner | 350/162.12 |
| 4,207,370 | 6/1980 | Lui | 350/162.12 |
| 4,287,486 | 9/1981 | Javan | 372/23 |

OTHER PUBLICATIONS

Sheffield et al., "An Independently Controllable Multiline Laser Resonator and Its Use In Multifrequency Injection Locking", Appl. Phys. Lett., vol. 29, No. 9, Nov. 1, 1976.

Primary Examiner—William L. Sikes
Assistant Examiner—Léon Scott, Jr.
Attorney, Agent, or Firm—John F. Lawler; Russell A. Cannon

[57] ABSTRACT

A pulsed or CW laser is rapidly switched to operate at one or more selectable wavelengths by means of intracavity insertion of beam dispersion and focussing elements and an apertured focal plane mask and shutter assembly. The laser beam has an axis and is dispersed into components or sub-beams having different axes and representing different wavelengths, the sub-beams being focussed to substantially reduced diameters on the focal plane mask at points, respectively, at which apertures are formed. Movable shutters adjacent to the respective apertures control alternate opening of and closing of the apertures and selectively permit the laser to resonate at at least one of a plurality of wavelengths corresponding to that of the sub-beam passing through an open aperture. Mask apertures having very small diameters (<50 microns) and separations are achieved enabling switching between different operating wavelengths in milliseconds. By focussing the sub-beams on the focal plane of the focussing element, the spatial distribution of the sub-beams at infinity is transformed to the focal plane thereby enhancing spectral selectivity with minimum space requirements.

9 Claims, 4 Drawing Figures

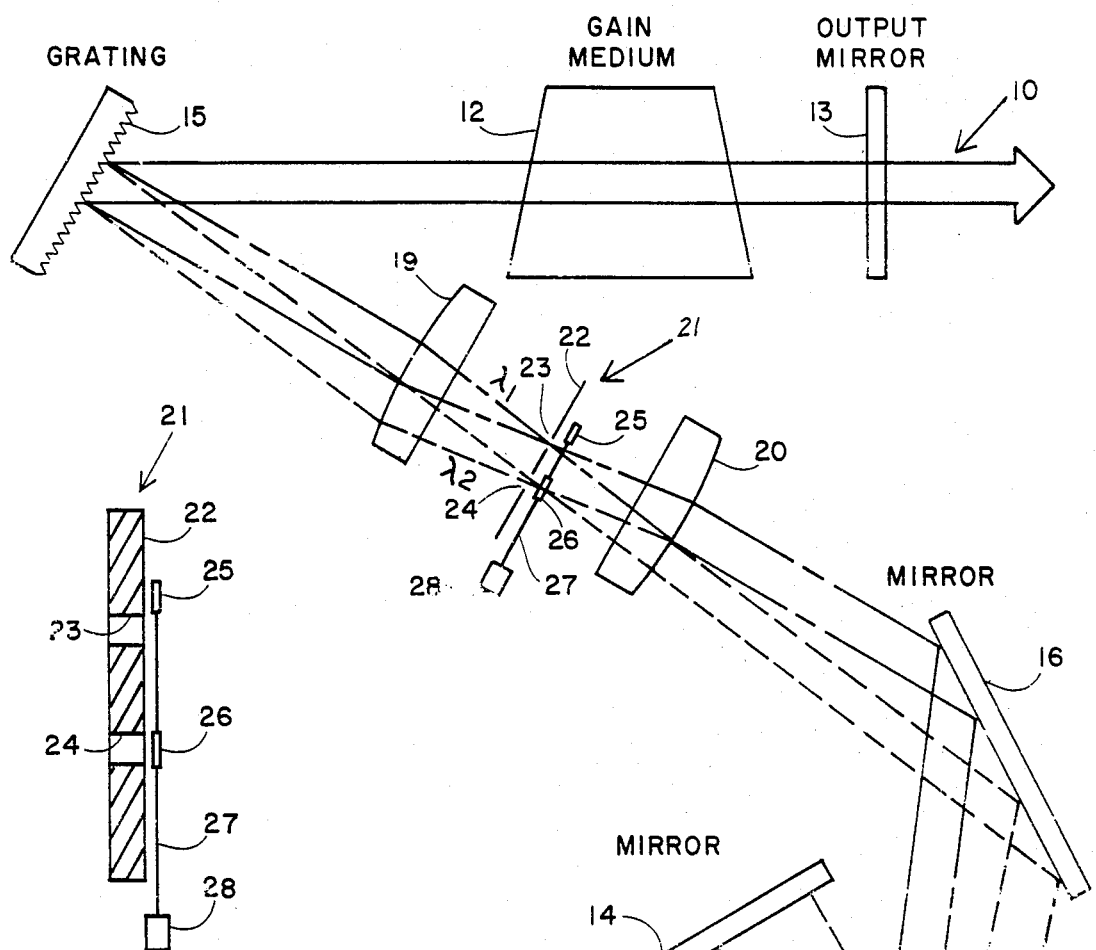
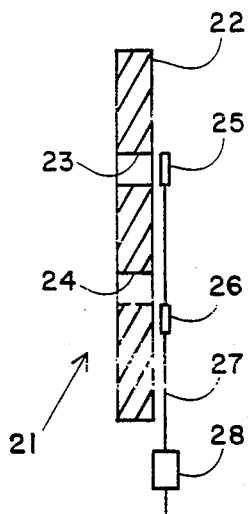
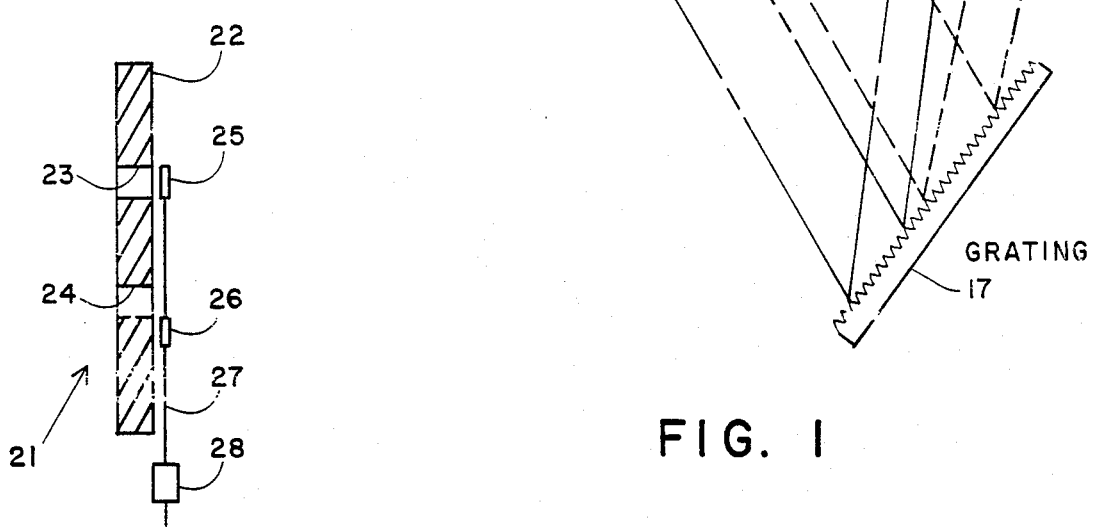
FIG. 1
FIG. 2
FIG. 3

MULTIPLE WAVELENGTH LASER

This application is a continuation-in-part of application Ser. No. 536,566, filed Sept. 27, 1983 which is a continuation-in-part of application Ser. No. 257,056, filed Apr. 24, 1981.

BACKGROUND OF THE INVENTION

This invention relates to lasers and more particularly to a multiple wavelength laser.

In certain high gain molecular lasers such as a transversely excited-atmospheric (TEA) $CO_2$ laser, simultaneous oscillations at a plurality of different wavelengths can occur. For example, a $CO_2$ laser may have simultaneously oscillating transitions at more than 10 different wavelengths between 9 and 11 microns. For certain applications, it is desirable to selectively operate this laser at any one of these wavelengths and to have the capability of instantly switching the operation from one wavelength to the other. An example of an application requiring this capability is a laser radar system.

Existing techniques for tuning laser wavelengths involve the insertion and/or adjustment of optical elements within the laser resonator. These techniques include the following:

1. Prisms. Dispersive prisms are utilized to separate the components of the potential laser operating spectrum in angle. By adjusting the laser cavity axis or prism alignment appropriately, only the desired wavelength is aligned for optical resonance to produce a useful output.

2. Diffraction gratings. Spectrally dispersive gratings are used in the same manner as with the prisms described above.

3. Absorbing filters. Materials which exhibit wavelength dependent absorption effects are used to provide spectral tuning or selection. When such a material is placed within a laser resonator capable of oscillating over a particular spectral region, the filter in general perturbs the oscillation so as to produce an output in the spectral regions of simultaneous low-loss/high-gain. Tuning is effected by varying the optical density or spectral characteristics of the absorption spectrum of the filter.

4. Etalons. Interference effects between one or more parallel intracavity mirrors produce a spectrally varying transmission function. When such a device is placed within a laser resonator capable of oscillating over a particular spectral region, the etalon is general perturbs the oscillation so as to produce an output in the spectral region of simultaneous low-loss/high-gain. Tuning is effected by mechanically tilting, varying mirror spacing, or varying the refractive index of intra-mirror media (e.g., by changing gas pressure).

5. Birefringent Tuners. By using a combination of birefringent elements and polarizers, a device is constructed which exhibits a spectrally dependent transmission function and which operates within a laser resonator in the manner similar to that described for etalons. Tuning is effected by either mechanically rotating or temperature tuning of the birefringent elements.

6. Dielectric coatings. In a manner analogous to etalons, multilayer dielectric coatings exhibiting wavelength dependent transmission or reflection functions are used to implement spectral control. Typical tuning techniques involve change in coating design and mechanical tilt.

Difficulties of the above techniques for spectral tuning or selection are summarized as follows:

A. Mechanical instability (1, 2 and 4).
B. Insufficient selectively for use with high gain lasers (1, 3, 4).
C. Excessive losses (2, 3, 5).
D. Excessive complexity (1, 5, 6).

In addition to these areas of generic weakness, a particular problem exists which restricts the use of wavelength tuners or selectors in many applications, that is, the inability of conventional tuning techniques to rapidly and reliably change wavelengths under long term use in fieldable systems. To understand the problem fully, the case of a moderate pulse rate laser radar system using spectral differential absorption or scattering may be considered. Typical requirements involve the use of a $CO_2$ pulsed laser producing outputs at 10 wavelengths from 9 to 11 microns. Each successive pulse must be at a different wavelength, and 100–200 Hz pulse rates are required. This performance implies that the spectral tuner must provide fractional spectral shifts, $\Delta\lambda/\lambda$, of 2% within a period of 5–10 milliseconds. While all of the above techniques may be capable of achieving the spectral range, none is believed capable of achieving the desired speed in an operating laser. This is seen in the case of elements requiring mechanical rotation of resonator alignment sensitive components, that is, it is in general impossible to accelerate, position, stop and stabilize a finite sized optical element within the required times. Such systems are unreliable and produce laser outputs which suffer fatal flaws in the areas of pulse energy instability, excessive beam divergence, and unacceptable boresight jitter.

Other approaches, using continuous rotation of optical elements have proven unworkable for similar reasons. Etalon approaches, using pressure tuning or mechanical (piezoelectric) cavity length tuning, are somewhat more attractive from the point of view of stability, but require the use of extremely thin (and hence delicate) cavity spacings to achieve the required free spectral range and also do not appear compatible with rapid tuning.

In addition to the above prior art techniques, a multiline laser resonator with a double grating wavelength selector is described in an article entitled "An Independently Controllable Multiline Laser Resonator and Its Use In Multifrequency Injection Locking", by A. Javan, et al, *Applied Physics Letters*, Vol. 29, 588 (1976). Wavelength selection is accomplished by means of apertures adjacent to the plane HR mirror. The disadvantage of this technique is that each aperture has approximately the same diameter as the beam, i.e., approximately 1 cm, and therefore the shutters which are moved relative to the apertures to select various wavelengths have the same size. The mass and inertia of such shutters make this technique impracticable for applications requiring switching speeds of less than 10 milliseconds. Moreover, spectral selectivity, i.e., the capability of separating closely spaced transition lines, is limited by this technique because operation is confined to the near field where spatial separation of dispersed subbeams is minimal.

This invention is directed to a laser system having improved wavelength selection capability.

OBJECTS AND SUMMARY OF THE INVENTION

A general object of this invention is the provision of a multiline laser system capable of selectively operating at one of a plurality of wavelengths and of being switched from one wavelength to the other rapidly, i.e., 10 milliseconds or less.

A further object is the provision of such a laser system in which wavelength selection is achieved without disturbing critical alignment of optical elements.

These and other objects of the invention are achieved by a multiline laser system with a wavelength selector having dispersive and focussing elements in combination with a focal plane assembly comprising a mask located in the focal plane of the focussing element and having a plurality of apertures and a like number of shutters for selectively controlling optical transmission through at least one of the apertures in the mask. By dispersing the laser beam into a plurality of sub-beams and focussing the sub-beams on the mask, the spatial distribution of the sub-beams at infinity is transformed by Fourier transform optics to the focal plane and extremely small aperture diameters are realized enabling the use of correspondingly small shutters which are capable of being moved between operating positions in a few milliseconds.

DESCRIPTION OF PREFERRED EMBODIMENTS

Figure 4:
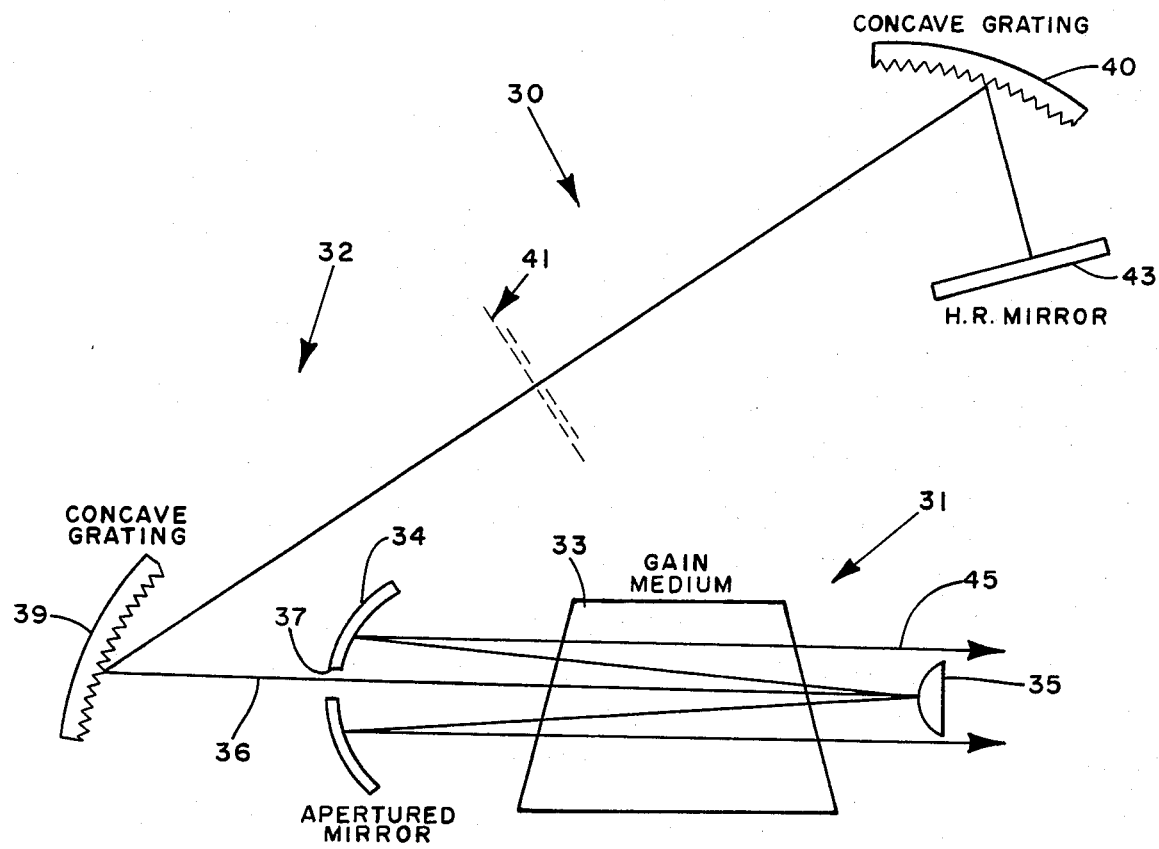

Referring now to the drawings, FIG. 1 illustrates an embodiment of the invention in a laser system 10 comprising an active gain medium 12, an output reflector or mirror 13 and a totally reflective mirror 14, the two reflectors and the active medium constituting the laser cavity capable of operating on more than one wavelength. The gain medium 12, by way of example, may comprise a pulsed carbon dioxide laser capable of producing 10 or more discrete wavelengths from 9 to 11 microns. The intracavity laser beam is incident on intermediate diffractive grating 15 which produces sub-beams of different wavelengths, two of which are shown here.

In accordance with this invention, lenses 19 and 20 are spaced between grating 15 and a mirror 14 and focus the beam passing through them on a focal plane selector 21 comprising a multi-apertured mask 22 located at the focal plane of lenses 19 and 20. While mask 22 is formed with a number of apertures corresponding to the number of different wavelengths generated in the particular laser system, such as ten or more for the pulsed $CO_2$ device assumed, for simplicity in explaining the invention the mask 22 is depicted as having two apertures 23 and 24. Adjacent to apertures 23 and 24 and comprising part of selector 21 are shutters 25 and 26, respectively, supported on a common link 27. Shutters 25 and 26 are positioned relative to apertures 23 and 24 so that one shutter is aligned with or optically blocks the associated aperture when the other shutter is offset from or optically unblocks its associated aperture. Thus, as shown in FIG. 2, shutter 25 is offset from associated aperture 23 while shutter 26 blocks aperture 24. Vertical displacement of link 27 is produced by a transducer 28 such as a relay solenoid connected thereto and operative to rapidly and selectively alternately shift shutters 25 and 26 downwardly as viewed and thereby close and open apertures 23 and 24, respectively, see FIG. 3.

Grating 15 receives undispersed cavity radiation and separates the spectral components by angle as shown in FIG. 1. For purposes of illustration, two sub-beams having wavelengths $\lambda_1$ (long and short dashed lines) and $\lambda_2$ (short dashed lines) are shown. Lens 19 focusses diffracted sub-beams $\lambda_1$ and $\lambda_2$ to minimum diameters at apertures 23 and 24, respectively in mask 22. Lens 20 receives sub-beam $\lambda_1$ from aperture 23 and collimates it for reflection by mirror 16 to a second diffraction grating which in practice is located at a near Littrow condition with the mirror 14 for reflecting radiation back through the cavity. It will be noted, however, that FIG. 1 is not drawn to scale or with true angles for rays and elements for convenience of illustration. Gratings 14 and 17 are similar in construction, that is, both have the same groove spacings. Diffraction gratings are described in the *Handbook of Diffraction Gratings Ruled and Holographic* by Jobin Yvon Optical Systems, which is incorporated herein by reference.

In operation the wavelength at which the laser system operates is controlled by the position of shutters 25 and 26 relative to apertures 23 and 24, respectively, in mask 22. With the shutters in the position shown in FIG. 2, aperture 24 is blocked, aperture 23 is open and the laser operates at the wavelength $\lambda_1$. When the positions of the shutters are switched so that aperture 23 is blocked and aperture 24 is open as shown in FIG. 3, the laser operates at wavelength $\lambda_2$. Switching the operation of the laser between these two wavelengths is accomplished by shifting the position of the shutters by means of transducer 28. The focal spot diameters of sub-beams $\lambda_1$ and $\lambda_2$ are extremely small, e.g., approximately 50 microns for a typical $CO_2$ laser, and shutters 25 and 26 as well as the separation of the apertures are correspondingly small. Thus the mass of the shutters as well as their travel between operative positions are minimal so that opening and closing the apertures by operation of transducer 28 occurs in less than 10 milliseconds.

It is noted that because frequency selection does not involve angular or spatial motion of resonator optical elements, the wavelength selection assembly embodying this invention is extremely stable mechanically. The invention may be practiced with different dispersing elements, such as prisms or may also use combined disperser/focussing elements. In addition, any number of different techniques may be used rapidly to alternately block and uncover focal plane mask apertures, such as rotating wheels, magnetically actuated reed shutters and the like. The invention is generally applicable to pulsed and continuous lasers operating over ultraviolet, visible and infrared spectral regions, and may be extended to microwave applications in which quasioptical analogs of lenses and gratings exist.

In addition to reducing the diameters of the sub-beams, lenses 19 and 20 function as Fourier transform elements to induce in each sub-beam at the lens focal plane the same spatial distribution in amplitude and phase that would exist in the sub-beam at infinity if allowed to propagate there. This far field property of the focussing elements enhances the capability of the assembly to separate closely spaced transitions or lines of the laser and thus achieve high spectral selectivity in a minimum of space. Such separation of lines is particularly advantageous with lasers having beams with relatively large diameters, for example, 1–10 cm., which tend to overlap in the near field, causing undesired coupling between adjacent lines.

An alternate embodiment of the invention in which combination disperser/focussing elements are used is shown in FIG. 4 and comprises a laser system 30 having an unstable resonator 31 and a wavelength selector assembly 32 optically coupled to resonator 31. Resonator 31 comprises a TEA section 33, a concave mirror 34 on one side of section 33 and a convex mirror 35 on the opposite or output side of the laser system. Most of the energy in the system resonantes between mirrors 34 and 35 with a small fraction (approximately 5%) escaping as beam 36 through a small aperture 39 of about 3–5 mm in diameter in mirror 34. Beam 36 then passes through focal plane selector assembly 32 consisting of first and second substantially identical concave gratings 39 and 40 and a focal plane selector 41 similar to selector 21 at the common focal plane of gratings 39 and 40. Gratings 39 and 40 each function as a beam dispersing and focussing element in the same manner and with the same advantage as do the gratings and lenses described above. A flat highly reflective mirror 43 receives the beam from grating 40 and reflects it back into the system. The wavelength of the beam 36 is determined by the selected location of the open aperture in selector 41 as described above and this is the wavelength of output beam 45 from mirror 34.

What is claimed is:

1. A laser system comprising;
   a lasing medium pumped to produce a laser beam,
   feedback and output reflectors spaced from opposite ends, respectively, of said medium and defining the laser cavity for circulating said laser beam along its axis and between said reflectors, and
   a wavelength selection assembly in said cavity comprising:
   means to disperse said laser beam into a plurality of sub-beams having axes different from each other and from said beam axis and to focus the sub-beams on a focal plane whereby optically to transform to the focal plane the spatial distribution of the sub-beams at infinity,
   a mask in said focal plane having a plurality of apertures at the foci, respectively, of said sub-beams, and
   means for selectively opening at least one of said apertures and closing others whereby the laser resonates at the wavelength of the sub-beam passing through said one aperture.

2. A laser system according to claim 1 in which said dispersing and focussing means comprises concave refractive gratings on opposite sides, respectively, of said mask.

3. A laser system according to claim 1 in which said dispersing and focussing means comprises
   a first diffraction grating providing said dispersion,
   a first lens between said first grating and said mask,
   a second lens on the side of said mask opposite from said first grating for collimating sub-beams incident thereon from said mask, and
   means including said feedback reflector for redirecting light sub-beams back to said second lens.

4. A laser system according to claim 1 in which said means for selectively opening comprises a like number of shutters adjacent to said apertures, respectively, and motor means connected to said shutters to move said shutters relative to said mask.

5. A laser system comprising;
   a lasing medium pumped to produce a laser beam,
   feedback and output reflectors spaced from opposite ends, respectively, of said medium and defining the laser cavity for circulating said laser beam along its axis and between said reflectors, and
   a wavelength selection assembly in said cavity comprising
   means to disperse said laser beam into a plurality of sub-beams having axes different from each other and from said beam axis and to focus the sub-beams on a focal plane whereby optically to transform to the focal plane the spatial distribution of the sub-beams at infinity, and
   means for selectively unblocking at least one of said sub-beams at said focal plane and blocking other sub-beams whereby the laser resonates at the wavelengths of the unblocked sub-beams.

6. A method of tuning a multiple wavelength laser having a beam propagating on the beam axis within the laser cavity consisting of the steps of
   dispersing said laser beam within said cavity into a plurality of sub-beams having different wavelengths and axes different from said beam axis and focussing said sub-beams to minimum diameters, respectively, at a like number of spatially separated points on a focal plane whereby optically to transform to the said focal plane the spatial distribution of the sub-beams at infinity, and
   blocking propagation of certain of said sub-beams at said focal plane and permitting propagation of at least one of said sub-beams.

7. The method according to claim 6 in which the laser beam is simultaneously dispersed and focussed into spatially separated points at the focal plane.

8. The method according to claim 6 in which the laser beam is successively dispersed and focussed into spatially separated points at the focal plane.

9. The method according to claim 8 including the additional step of selectively unblocking at least one of said blocked sub-beams and simultaneously blocking the other sub-beams.

* * * * *